United States Patent
Mireles et al.

(10) Patent No.: US 12,053,767 B2
(45) Date of Patent: Aug. 6, 2024

(54) SYSTEMS, METHODS, AND DEVICES FOR ADDITIVE MANUFACTURED ULTRA-FINE LATTICE STRUCTURES FOR PROPULSION CATALYSTS

(71) Applicants: The National Aeronautics and Space Administration, Washington, DC (US); EOS North America, Novi, MI (US)

(72) Inventors: Omar Mireles, Huntsville, AL (US); Zachary Jones, Montreal (CA); Maryna Ienina, Pflugerville, TX (US); Ankit Saharan, Pflugerville, TX (US)

(73) Assignees: EOS North America, Novi, MI (US); The National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 17/803,491

(22) Filed: Aug. 4, 2022

(65) Prior Publication Data

US 2023/0077922 A1   Mar. 16, 2023

Related U.S. Application Data

(60) Provisional application No. 63/229,864, filed on Aug. 5, 2021.

(51) Int. Cl.
| | |
|---|---|
| *B01J 23/42* | (2006.01) |
| *B01J 23/46* | (2006.01) |
| *B01J 35/56* | (2024.01) |
| *B01J 37/00* | (2006.01) |
| *B01J 37/02* | (2006.01) |
| *B22F 10/28* | (2021.01) |
| *B33Y 10/00* | (2015.01) |

(52) U.S. Cl.
CPC .......... *B01J 37/0018* (2013.01); *B01J 35/56* (2024.01)

(58) Field of Classification Search
CPC ........ B01J 23/42; B01J 23/464; B01J 23/468; B01J 35/56; B01J 37/0018; B01J 8/008; B01J 8/02; B01J 13/0203; B22F 10/28; B33Y 10/00; C01B 21/02
USPC ......................................................... 502/339
See application file for complete search history.

(56) References Cited

U.S. PATENT DOCUMENTS

| | | | |
|---|---|---|---|
| 6,531,106 B1 * | 3/2003 | Nojima ................... | C01B 3/583 |
| | | | 423/247 |
| 9,415,137 B2 * | 8/2016 | Meridew ................. | A61L 27/50 |
| 10,492,913 B2 * | 12/2019 | Meridew ................. | A61L 27/56 |
| 10,844,475 B2 * | 11/2020 | Irumata ................... | C04B 35/64 |

(Continued)

*Primary Examiner* — Cam N. Nguyen
(74) *Attorney, Agent, or Firm* — McDonnell Boehnen Hulbert & Berghoff LLP

(57) ABSTRACT

In one aspect, a method for manufacturing a lattice structure for use as a propulsion catalyst includes: (a) providing a powder bed of one or more metal powder materials, (b) heating a portion of the powder bed to a temperature sufficient to melt the one or more metal powder materials, (c) forming a layer of the lattice structure, wherein the layer is formed by melting the one or more metal powder materials in a predefined pattern, (d) constructing the lattice structure, wherein the lattice structure is constructed by repeating steps (a)-(c) for each of a plurality of layers of the lattice structure until the lattice structure is constructed, and (e) removing excess materials from the constructed lattice structure.

21 Claims, 16 Drawing Sheets
(12 of 16 Drawing Sheet(s) Filed in Color)

(56) References Cited

U.S. PATENT DOCUMENTS

| | | | | |
|---|---|---|---|---|
| 11,672,886 B2* | 6/2023 | Meridew | ............. | A61L 27/50 |
| | | | | 264/642 |
| 2022/0054967 A1* | 2/2022 | McMurtry | ............. | B33Y 10/00 |
| 2023/0039200 A1* | 2/2023 | Perego | ............. | A61L 27/04 |

* cited by examiner

| Name | Image | Hatch lines in EOSPrint | Geometry | Exposure Type |
|---|---|---|---|---|
| Hexa_Profile_0m | | | Volume | Support |
| Penta_Cube_0m | | | Support | Support |
| Lattice-04_40µm_0m | | | Volume | Support |
| Lattice-04_60µm_0m | | | Volume | Support |
| Lattice-04_80µm_0m | | | Volume | Support |
| Lattice-04_70µm_surface_0m | | | Surface | Support |
| Grasshopper | | | Surface | Support |

Figure 1

SYSTEMS, METHODS, AND DEVICES FOR ADDITIVE MANUFACTURED ULTRA-FINE LATTICE STRUCTURES FOR PROPULSION CATALYSTS

CROSS-REFERENCE TO RELATED APPLICATION

This application claims priority to U.S. Provisional Application No. 63/229,864, filed on Aug. 5, 2021, which is hereby incorporated by reference in its entirety.

USAGE AND TERMINOLOGY

The invention described herein was made in the performance of work under a NASA contract and by an employee of the United States Government and is subject to the provisions of Section 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore. In this disclosure, unless otherwise specified and/or unless the particular context clearly dictates otherwise, the terms "a" or "an" mean at least one, and the term "the" means the at least one.

SUMMARY

In one aspect, a method for manufacturing a lattice structure particularly for use as a propulsion catalyst is disclosed. The method includes: (a) providing a powder bed of one or more metal powder materials, (b) heating a portion of the powder bed to a temperature sufficient to melt the one or more metal powder materials, (c) forming a layer of the lattice structure, wherein the layer is formed by melting the one or more metal powder materials in a predefined pattern, (d) constructing the lattice structure, wherein the lattice structure is constructed by repeating steps (a)-(c) for each of a plurality of layers of the lattice structure until the lattice structure is constructed, and (e) removing excess materials from the constructed lattice structure.

In another aspect, a non-transitory computer-readable medium, having stored thereon program instructions that, upon execution by a computing device, cause the computing device to perform a set of operations for manufacturing a lattice structure for use as a propulsion catalyst is disclosed. The set of operations includes: (a) providing a powder bed of one or more metal powder materials, (b) heating a portion of the powder bed to a temperature sufficient to melt the one or more metal powder materials, (c) forming a layer of the lattice structure, wherein the layer is formed by melting the one or more metal powder materials in a predefined pattern, (d) constructing the lattice structure, wherein the lattice structure is constructed by repeating steps (a)-(c) for each of a plurality of layers of the lattice structure until the lattice structure is constructed, and (e) removing excess materials from the constructed lattice structure.

BRIEF DESCRIPTION OF THE DRAWINGS

The patent or application file contains at least one drawing executed in color. Copies of this patent or patent application publication with color drawings will be provided by the Office upon receipt and payment of the necessary fee.

FIG. 1 illustrates a table of several example lattice topology geometries.

DETAILED DESCRIPTION

I. Overview

Figure 2A:
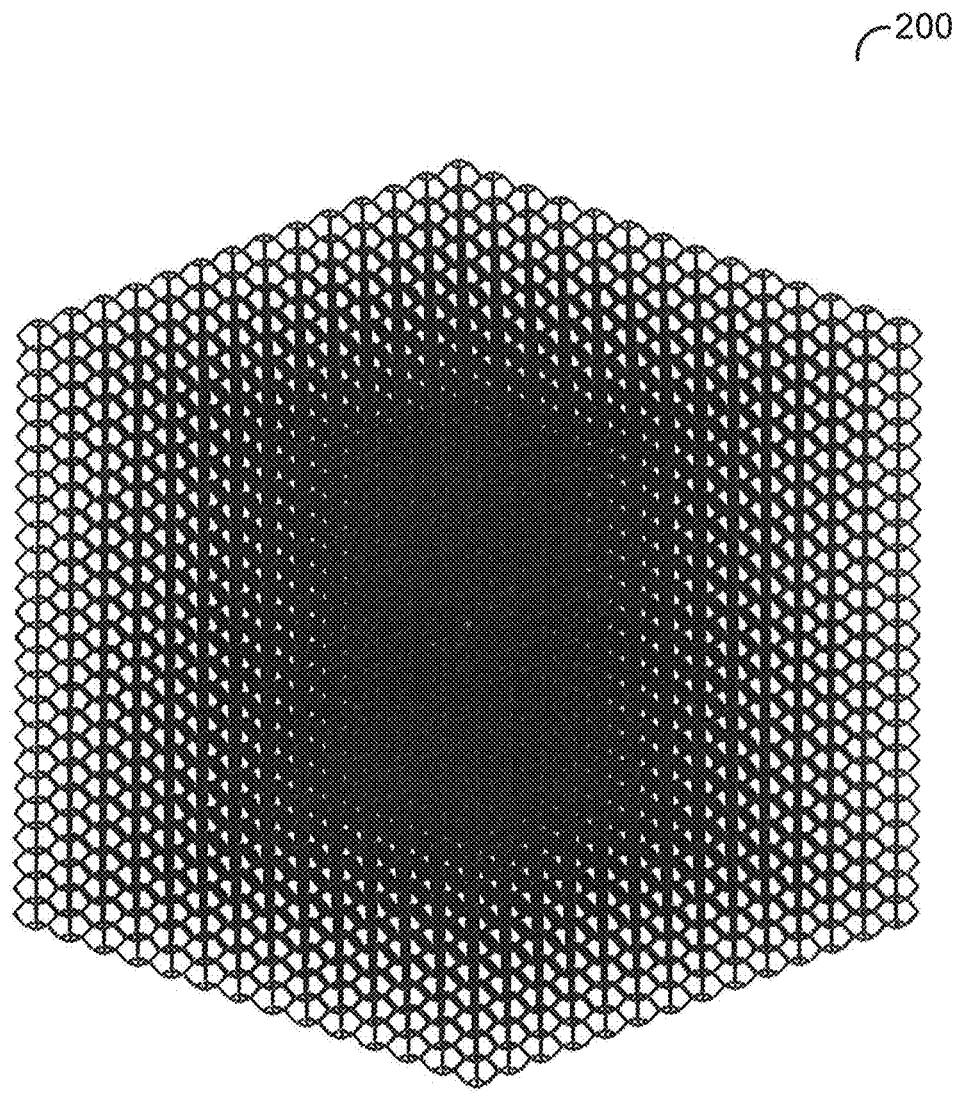
FIG. 2A illustrates an example lattice topology geometry, according to an example embodiment.

Traditionally, mono-propulsion catalysts have comprised coated ceramic or carbon foams that possess anisotropic and/or stochastic mechanical and fluid properties limiting design, cost, availability, and operational use. For example, these coated ceramic and/or carbon foams exhibit anisotropic mechanical properties, and inconsistent fluid flow behavior (e.g., due, in part, to thousands of irregular pores with varying size and distribution). In addition, mechanical and fluid flow properties can vary widely depending on the porous substrate manufacture method and the subsequent coating method utilized to arrive at a final part. Furthermore, although these foams may be coated with one or more platinum group metals ("PGMs") (e.g., ruthenium, rhodium, palladium, osmium, iridium, and/or platinum), such designs have resulted in spatially non-uniform deposition, particularly in the foam interior. As such, during installation these coated foams are highly susceptible to damage by compressive press fitting into the reaction chamber.

Due to manufacturing limitations, these foams constrain design, cost, availability, and operational use. Additionally, these catalysts are produced by a limited number of suppliers that constrain availability and cost.

If, however, manufacturers could leverage Additive Manufacture ("AM") technologies to provide an efficient, effective, and novel solution for consistent (non-stochastic)

catalyst structures, then the overall properties, availability, and costs associated with these catalysts would be improved.

Accordingly, features of the present disclosure can help to address these and other issues to provide an improvement to select technical fields. More specifically, features of the present disclosure help address issues within and provide improvements for select technical fields, which include for example, material sciences, thermodynamics, propulsion systems, and related fields. These features will now be described herein and in the claims below.

Embodiments of the present invention provide methods, systems, and devices that leverage AM technologies to generate ultra-fine lattice catalyst structures capable of replacing coated ceramic and/or carbon foams catalysts. In this regard, AM ultra-fine lattice structures may be manufactured to mimic the operational intent of coated foams but with improved design flexibility, non-stochastic behavior, compressive strength, and flow behavior printed from into a single part directly from one or more preferred materials (e.g., PGMs and/or one or more metals coated with one or more PGMs).

More specifically, example embodiments relate to methods, systems, and devices for improving the consistency and performance of manufactured catalysts in propulsion systems (e.g., as mono-propellant system catalysts). For example, ultra-fine lattice structures may comprise repeating unit cells with ligament and/or median strut thickness as small as 100 µm. As discussed further herein, experimental results demonstrate that AM ultra-fine lattices improved geometric and performance repeatability with the potential for significantly increased availability while decreasing cost and lead time.

In example embodiments, a method for manufacturing a lattice structure for use as a propulsion catalyst includes providing a powder bed of one or more metal powder materials. In some example embodiments, these one or more metal powder materials may include one or more metals (e.g., (i) tungsten, (ii) aluminum, (iii) titanium). In a further aspect, in some embodiments, these one or more metal powder materials may include one or more catalyst materials (e.g., (i) platinum; (ii) rhodium; (iii) iridium; (iv) ruthenium; and (v) silver). In a further aspect, in some example embodiments, these materials may be combined in one or more configurations during construction of the ultra-fine lattice structures. For example, the ultra-fine lattice structure may be constructed from one or more particular metal powder materials (e.g., tungsten) and then coated with one or more catalyst materials (e.g., one or more PGMs). In a further aspect, these one or more metal powder bed materials may include one or more substances that are in a solid, gaseous, or liquid phase, or some combination thereof. Additionally, the enclosed chamber may also contain one or more solid and/or liquid materials (including solid and/or liquid versions of the substances listed above), among other possibilities.

In a further aspect, the method for manufacturing a lattice structure for use as a propulsion catalyst may include heating a portion of the powder bed to a temperature sufficient to melt the one or more metal powder materials (e.g., one or more catalyst materials). To do so, the method may use one or more heat sources to melt the metal powder materials (e.g., one or more catalyst materials) using one or more technologies.

For example, in some embodiments, the heat source may be a laser. In a further aspect, the laser may operate at one or more wavelengths and may have a power output sufficient to melt the one or more metal powder materials contained in the powder bed. Other examples are possible.

In other examples, the heat source may include heat generated by one or more other heat sources, including one or more heating elements (e.g., in the space around the powder bed), among other possibilities.

In a further aspect, the method for manufacturing a lattice structure for use as a propulsion catalyst may include forming a layer of the lattice structure, potentially by using the one or more metal powder materials (e.g., one or more catalyst materials) in the powder bed. In some example embodiments, the layer may be formed by melting the one or more metal powder materials in a predefined pattern. This pattern may include one or more of several predefined patterns, including one or more of the following predefined patterns, for example, the patterns identified in FIG. 1: (i) a hexa profile lattice geometry (shown as "Hexa_Profile_0m" in FIG. 1); (ii) a penta cube lattice geometry (shown as "Penta_Cube_0m" in FIG. 1); (iii) a Lattice-04 40 micrometers lattice geometry (shown as "Lattice-04_40 µm_0m" in FIG. 1); (iv) a Lattice-04 60 micrometers lattice geometry (shown as "Lattice-04_60 µm_0m" in FIG. 1); (v) a Lattice-04 80 micrometers lattice geometry (shown as "Lattice-04_80 µm_0m" in FIG. 1); (vi) a Lattice-04 70 surface lattice geometry (shown as "Lattice-04_70 µm_surface_0m" in FIG. 1); and (vii) a grasshopper lattice geometry (shown as "Grasshopper" in FIG. 1), among other possibilities.

In a further aspect, the method for manufacturing a lattice structure for use as a propulsion catalyst may include constructing the lattice structure. To do so, the method may include repeating one or more of the method steps described above for each of a plurality of layers of the lattice structure until the lattice structure is constructed. For example, in some embodiments, may include repeating the method step of forming a layer of the lattice structure using one or more metal powder materials (e.g., one or more catalyst materials) in the powder bed over one or more predefined patterns until a three dimensional ultra-fine lattice structure is formed. Other examples are possible.

For example, the method for manufacturing a lattice structure for use as a propulsion catalyst may include using one or more industrial three-dimensional printing technologies that construct the lattice structure using one or more of the heating elements described above, among other possibilities For example, the method for manufacturing a lattice structure for use as a propulsion catalyst may include removing excess materials from the constructed lattice structure. To do so, the method may include removing materials (including the one or more metal powder materials) that were not melted during other steps of the methods described herein. Additionally or alternatively, the method may include removing particular materials (including the one or more metal powder materials) that were partially and/or completely melted during other steps of the methods described herein.

In a further aspect, these excess materials may be removed using one or more methods, including one or more of the following: (i) applying mechanical agitation to and/or through the constructed lattice structure in one or more directions; (ii) applying compressed gas to and/or through the constructed lattice structure in one or more directions; (iii) applying vacuum to and/or through the constructed lattice structure in one or more directions; (iv) sonicating (e.g., applying sound waves and/or sound energy) the constructed lattice structure in deionized water; and/or (v)

sonicating the constructed lattice structure in liquids other than deionized water, among other possibilities.

A. Example Experiment and Ultra-Fine Lattice Manufacturing Process

To illustrate the example embodiments described above, several ultra-fine lattice samples were prepared and tested to measure the efficacy of the proposed structures and designs. The project was divided into several phases of development in order iteratively measure experimental results. The phases included lattice structure design, AM parameter development, AM ultra-fine lattice specimen production, microstructural characterization, non-destructive evaluation, mechanical testing, and flow testing. For example, target pore size, strut thickness, pressure drop range, and compressive strength requirements were determined in order to guide AM lattice topology design and down-selection process criteria.

Optimized designs, computational tools, AM parameters, and post-process methods were developed. Specimens underwent x-ray microfocus CT, metallographic inspection, compression testing, and flow testing. Further details are provided below.

Phase 1: Lattice Structure Design

In the first phase of an example experiment, a range of desired lattice structural traits were identified by characterizing porous foam specimens using scanning electron microscopy ("SEM").

Initial lattice topology candidates for the improved ultra-fine lattice structures described herein were selected from commercial programs (e.g., Autodesk Netfabb, Rhino Grasshopper 3D, Materialise Magics structures library) and user designed topologies. Parameter development was first conducted for Ti6Al4V then for tungsten ("W") to act as low-cost surrogate materials in order to develop the process in anticipation of utilizing expensive PGM materials. Additionally, parameter development was conducted on an EOS M100.

During the example experiment, manufactured specimens were found to print reliably with little to no difficulties removing un-melted powder. However, as the unit cell size (a) decreased the standard topologies became increasingly computationally expensive and did not reliably yield the desired pore size and strut thickness specifications. Therefore, additional topologies had to be explored or custom-designed.

Therefore, custom lattice topologies were designed that would meet characteristic requirements, some examples of which are illustrated in FIG. 1 (described above), as well as described in Table 1, provided below:

TABLE 1

| Title | Geometry | Exposure Strategy | Sample L × W × H (mm) | Print Robustness |
| --- | --- | --- | --- | --- |
| Lattice 04-1 80 μm_0m | volume | support | 9.40 × 9.04 × 3.29 | Builds well with different parameters |
| Lattice 70 μm_surface_0m (Lattice 04 configuration) | surface | support | 1.6 × 1.6 × 4.08 | Variety of parameters |
| Lattice 04-1 60 μm_0m | part w/ volume | support | 1.66 × 1.66 × 4.07 | Struts overgrows, smaller pore size than anticipated |
| Hexa_Profile_0m | part w/ volume | support | ~10 × 10 × 10 | Possible solidification of smaller cross-section contours into the bubbles might reduce amount of catalysis reaction due to reduced lattice surface area to volume ratio. |
| Penta_Cube Lattice_0m | support | support | 10.75 × 10.75 × 10.73 | Sensitive to the parameters variation |
| Grasshopper | surface | support | 10 × 10 × 10 | Quick test for the structure without volume |

FIGS. 2A-5B show additional views of the example custom lattice topologies used in this example experiment.

Figure 2B:
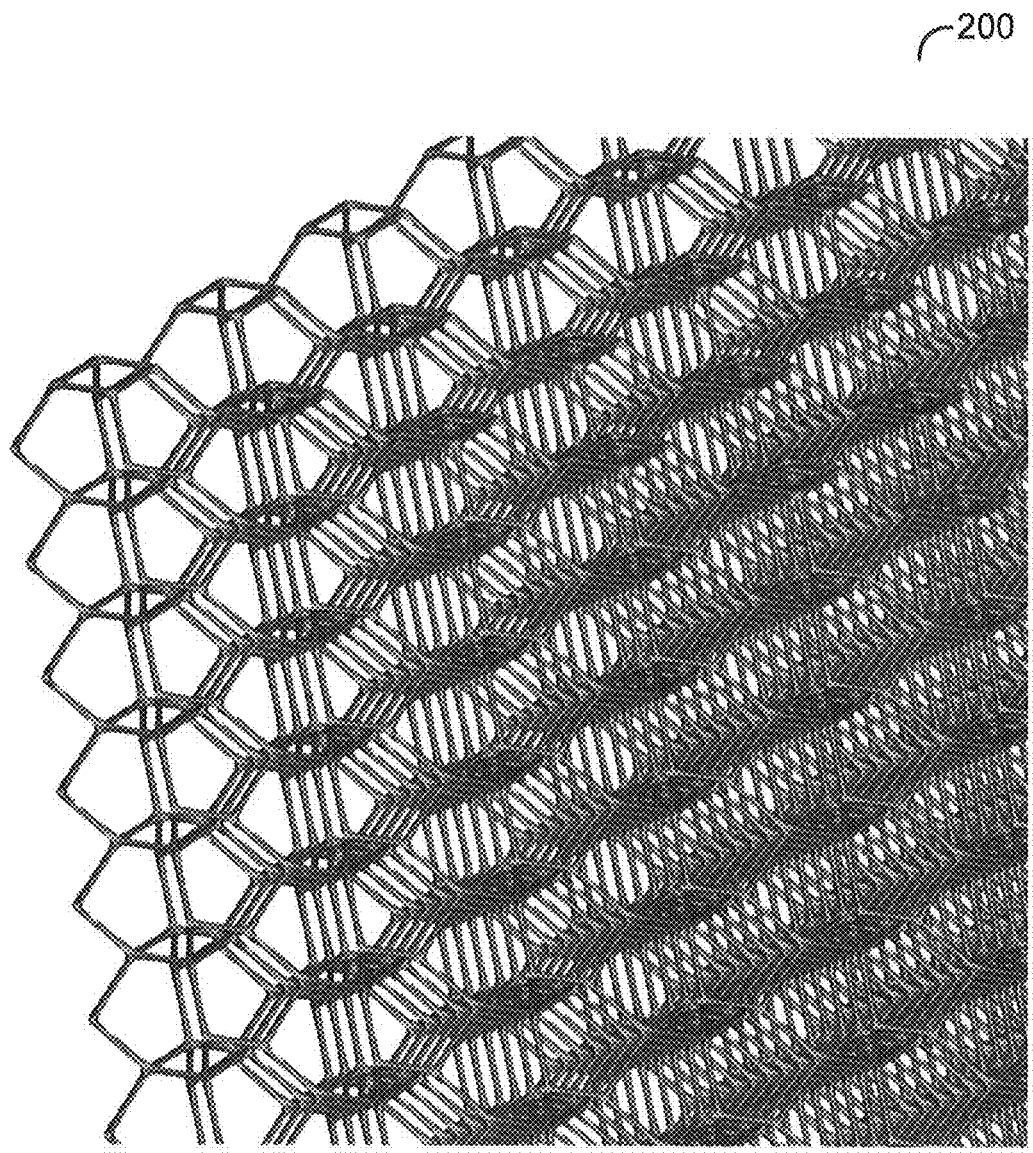
FIG. 2B illustrates a magnified view of a portion of the example lattice geometry of FIG. 1A, according to an example embodiment.

Namely, FIG. 2A shows a hexa profile lattice geometry 200, according to an example embodiment (also shown as "Hexa_Profile_0m" in FIG. 1). FIG. 2B is a magnified view of a portion of the lattice geometry of FIG. 2A, according to an example embodiment.

Figure 3:
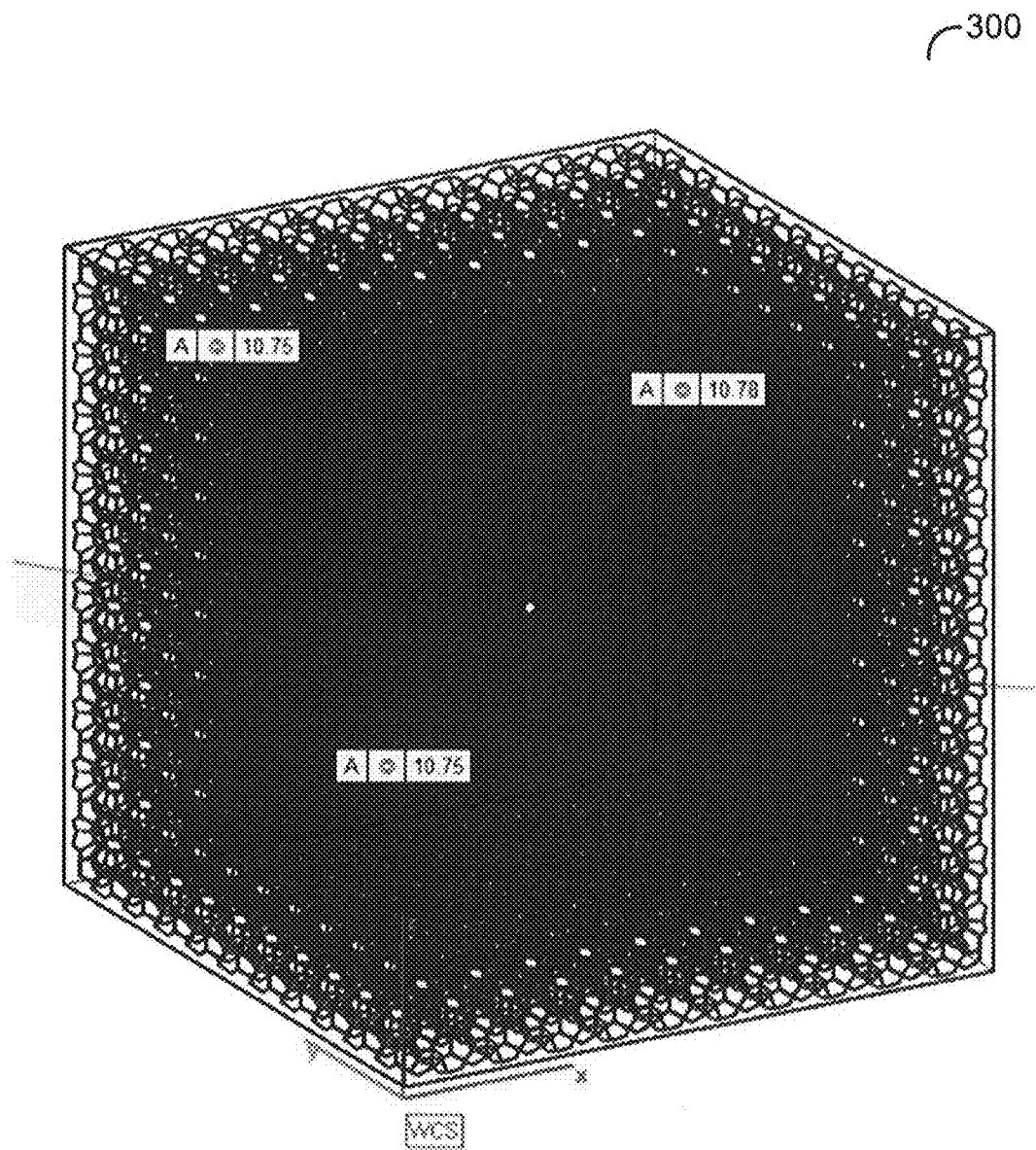
FIG. 3 illustrates an example lattice geometry, according to an example embodiment.

In a further aspect, FIG. 3 shows a penta cube lattice geometry 300, according to an example embodiment (also shown as "Penta_Cube_0m" in FIG. 1).

Figure 4A:
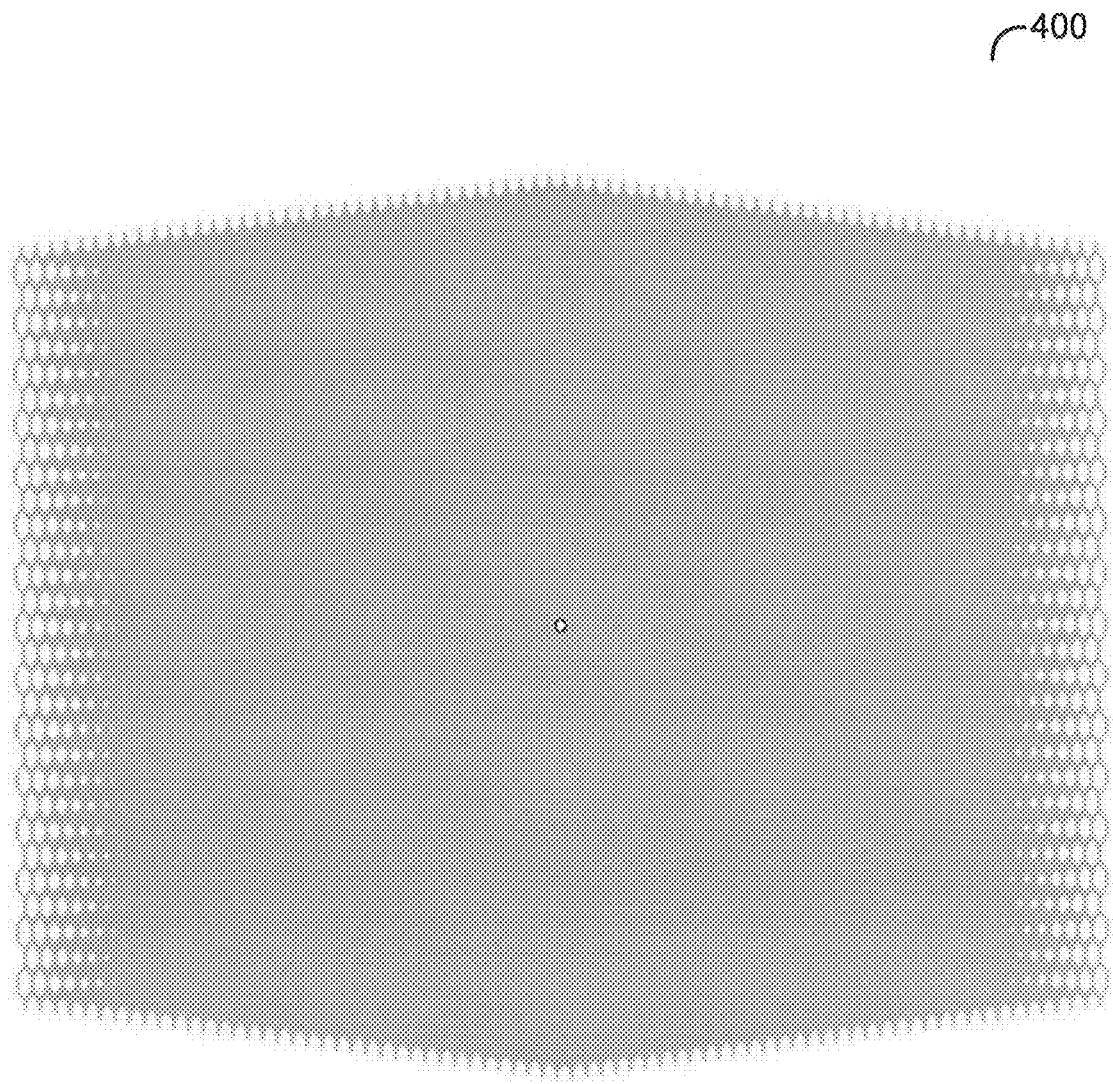
FIG. 4A illustrates an example lattice geometry, according to an example embodiment.
Figure 4B:
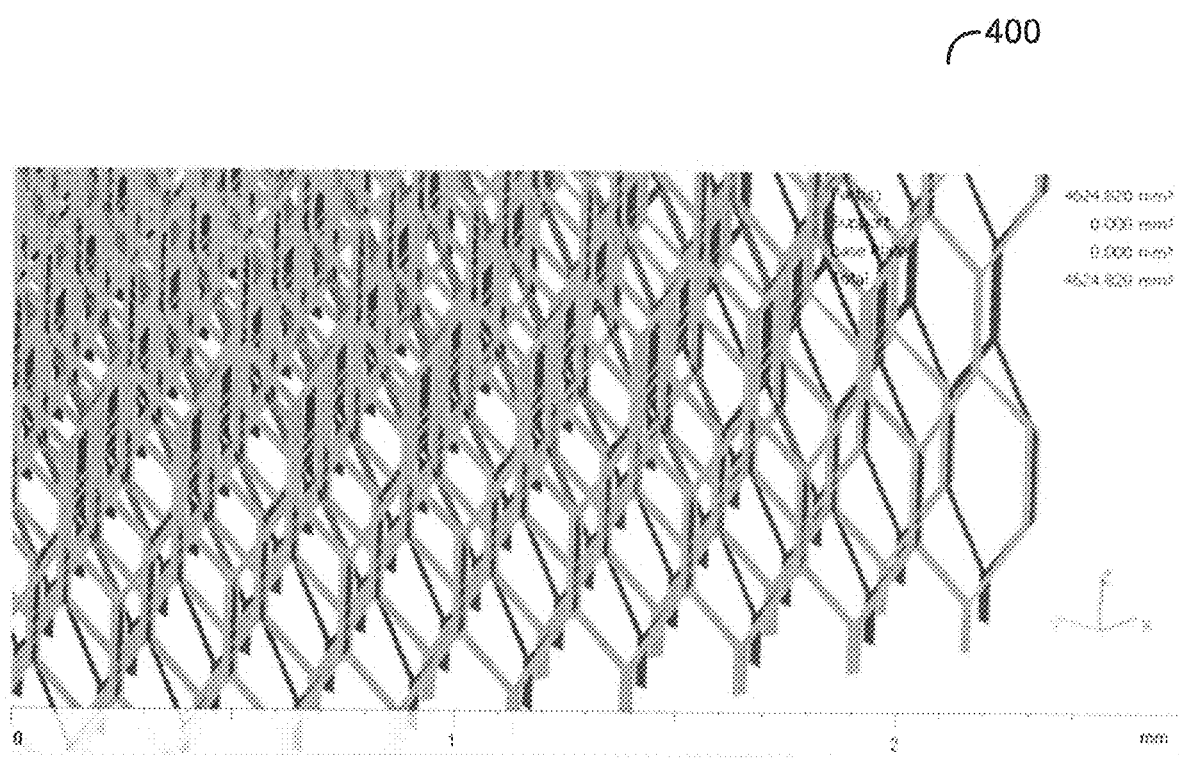
FIG. 4B illustrates a magnified view of a portion of the example lattice geometry of FIG. 3A, according to an example embodiment.

In a further aspect, FIG. 4A shows a Lattice-04 60 micrometers lattice geometry 400, according to an example embodiment (also shown as "Lattice-04_60 µm_0m" in FIG. 1). FIG. 4B is a magnified view of a portion of the lattice geometry of FIG. 4A, according to an example embodiment.

Figure 5A:
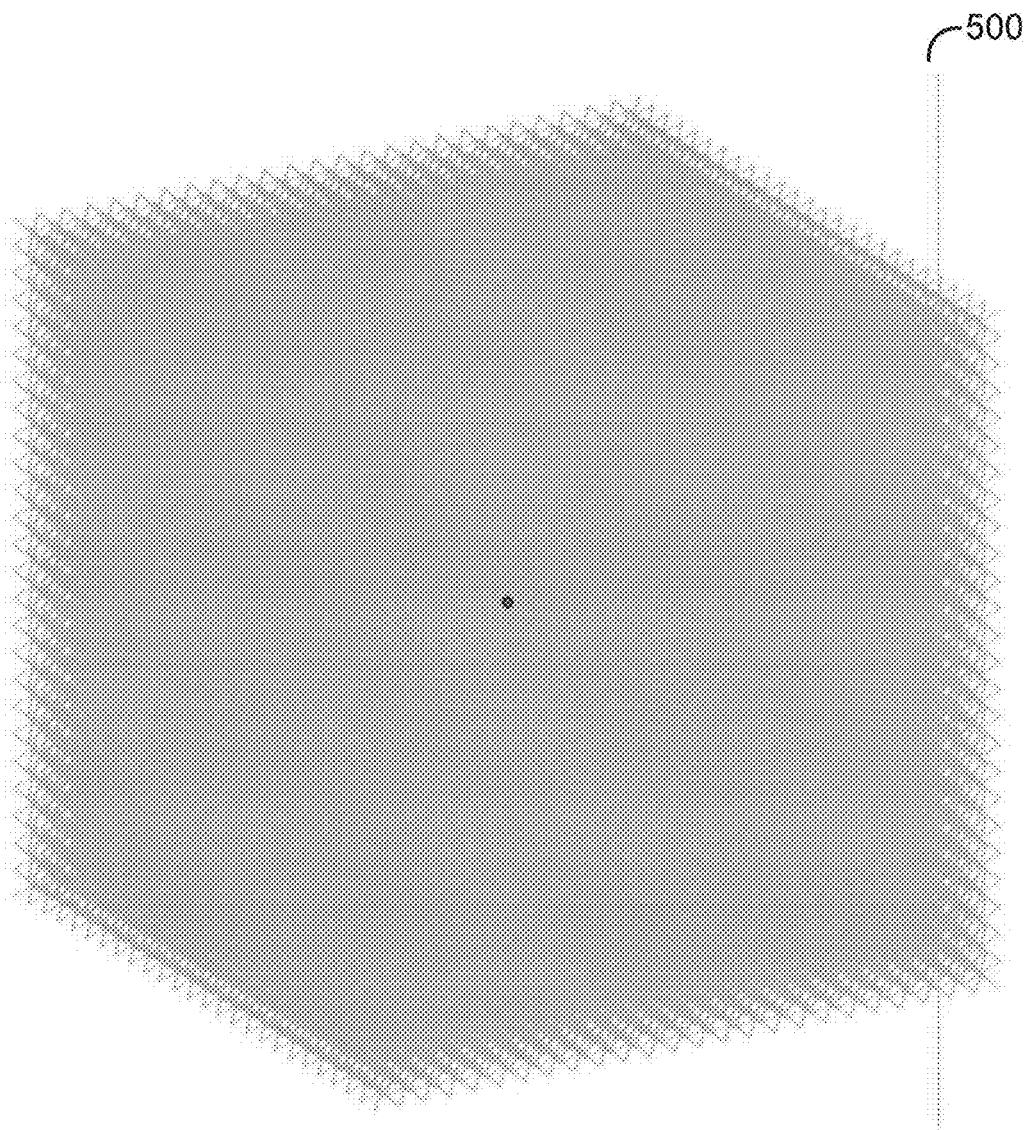
FIG. 5A illustrates an example lattice geometry, according to an example embodiment.
Figure 5B:
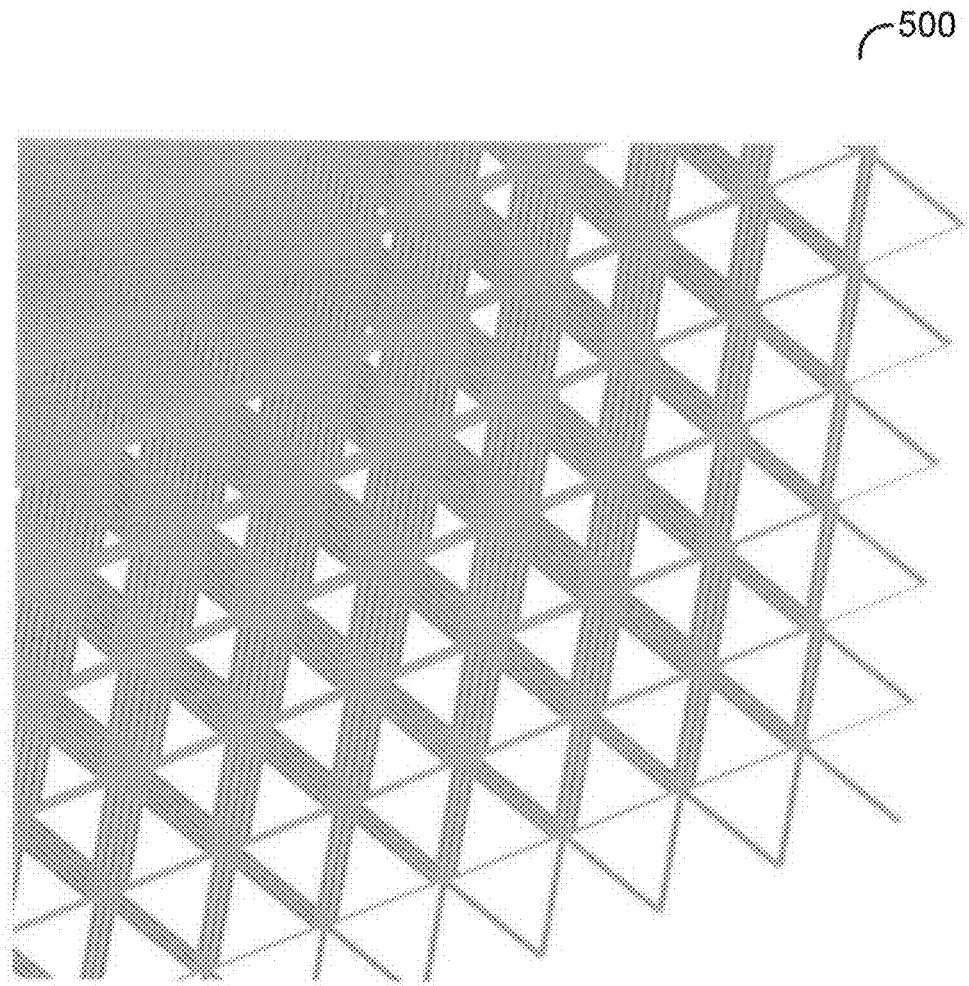
FIG. 5B illustrates a magnified view of a portion of the example lattice geometry of FIG. 4A, according to an example embodiment.

In a further aspect, FIG. 5A shows a grasshopper lattice geometry 500, according to an example embodiment (also shown as "Grasshopper" in FIG. 1). FIG. 5B is a magnified view of a portion of the lattice geometry of FIG. 5A, according to an example embodiment. Other examples and lattice topographies are possible.

Phase 2: Build Parameter Development and Specimen Production

In the second phase of an example experiment, a range of manufacturing parameters were identified by manufacturing several specimens using a number of different manufacturing parameters.

Specifically, Laser Powder Bed Fusion ("L-PBF") was selected from a variety of AM methods for a number of reasons. For example, L-PBF was found to have a small laser focus diameter. In a further aspect, by using L-PBF, the one or more materials in the powder bed reacted more favorably to the L-PBF methods, including that the one or more metal powder materials (e.g., metal powder powder) adjacent to the melt pool did not sinter to an excessive degree, which also helped facilitate excess material (e.g., metal powder) removal after printing.

In a further aspect, during this phase of the experiment, volumetric energy density (J/mm³) was optimized for the core or infill scan strategy, which was determined using the following equation:

$$E_v = \frac{P}{vDt}$$

(where P is the laser power units of watts, v is the laser scan speed in mm/s, D is the hatch distance in mm, and t is the layer thickness in millimeters). In a further aspect, single line scan strategy used for support structures and contours in the manufactured specimens were optimized using the following equation:

$$E_a = \frac{P}{vt}$$

(where $E_a$ is the area energy density (J/mm²)).

During this phase of the experiment, trials were undertaken to facilitate defining optimal specimen geometry, as well as help determine optimal energy input, exposure strategy (including D, contour, as vector lines) and beam offset (BO). Optimal processing parameters for the laser and scanning were defined by test matrix that focused on the energy density in the powder bed. In a further aspect, in this example experiment, the energy input variable can be quantitatively changed based on the commanded laser power and the speed at which the laser scanner moves the beam in the XY dimensions.

For example, during the example experiment, a high laser power and low speed might result in an excessive energy input and subsequently melt too much of one or more metal powder materials. This may result in thicker lattice struts in the manufactured specimen, thereby making the pores too small and excess materials difficult to remove from the manufactured specimen. Conversely, a low laser power and high speed may not impart sufficient energy to melt the material. In any event, the specimen lattice structures were successfully manufactured and the process described herein reliably reproduced consistent specimens with a high degree of repeatable quality and more predictable performance.

In the example experiment, parameter development was first conducted for Ti6Al4V then for W to act as low-cost surrogate materials in order to develop the process before attempting more expensive PGM materials.

During this phase of the experiment, an EOS M100 L-PBF platform was utilized, which had a nominal laser focus diameter of 40 µm, all of which allows for ultra-fine geometric features to be produced between 1.8-2 times the laser focus diameter. In a further aspect, low resolution optical microscopy found that the M100 was able to produce lattice structure unit cells with strut diameter within the goal of approximately 100 µm.

Additional specimens were printed on the MSFC EOS M100 from W using the same build parameters in order to increase the number of specimens needed for microstructural, mechanical and fluid flow characterization.

Phase 3: Lattice Specimen Post-Processing

In the third phase of an example experiment, a range of post-processing parameters were identified by removing excess materials from the manufactured specimens using a number of different parameters.

In particular, in the example experiment, lattice specimens underwent excess material removal through a combination of mechanical agitation, compressed gas (e.g., argon), and vacuum to minimize the amount of excess material (e.g., un-melted metal powder) trapped within the lattice cell volumes. In a further aspect, the lattice specimens were removed from the build plate using wire-EDM, water rinsed, and air dried. After plate removal, the lattice specimens underwent a more thorough excess material removal process by flowing compressed air through the specimens in parallel, perpendicular, and transverse to the build direction in a fume hood. The process was repeated until no particles were observed to be removed from the specimens.

Specimens were then sonicated in deionized water for 30 minutes, with specimens rotated specimens 90° every 10 minutes. After water sonication the specimens were dried with compressed air. The specimens were then sonicated in isopropyl alcohol for 30 minutes with the same rotation schedule then dried with compressed air. It was observed that excess materials continued to be liberated from the specimens in both water and sonication steps and the number of sonication cycles was repeated as required until little to no excess material was observed to be emitted from the specimens. Finally, the lattice specimens were stored in a desiccator for 24 hours prior to subsequent evaluation.

Phase 4: Microstructural Characterization of Ultra-Fine Lattice Specimens

In the fourth phase of an example experiment, optical microscopy was conducted to determine geometric accuracy of ultra-fine lattice structures and evaluate the as-built surface morphology, as well as determine the amount of trapped excess materials within the pores of the specimens.

In particular, in the example experiment, optical microscopy was conducted on the manufactured specimens and the Ti6Al4V specimens exhibited a substantial amount loosely adhered un-melted excess materials (e.g., metal powder particles) to the as-built surfaces of the specimen. This evaluation indicated characteristics common for L-PBF produced components, as well as for those specimens that were sectioned, mounted, ground, and polished in order to evaluate the interior, including where the lattice topology is retained, although there are still trapped powder within the pores and some strut cracking.

During the example experiment, the amount of powder adhering to W specimens was less than in Ti6Al4V, but was still evident. Additionally, W specimen struts exhibited smoother surface finish than Ti6Al4V specimens and the excess material particle size distribution for W was smaller than for Ti6Al4V, which is one of the factors used to improve surface finish of L-PBF components. Accordingly, surface adherent metal powder materials could be potentially beneficial if the ultra-fine lattice is printed from catalytic platinum metal due to an increased surface area that in-part drives the associated reaction kinetics when exposed to flowing propellant. Further, it is likely the adherent metal powder materials would react and erode away during the melting and fabrication steps of the methods described herein.

Additionally, a smoother surface finish may be desired for excess material removal and lower fluid pressure drop across the one or more metal powder materials. Further, from a mechanical property perspective a rougher surface finish can decrease fatigue life; however, fatigue was not one of the dominant failure mechanisms identified during thruster operation in propulsion systems. Thus, additional secondary processes such as chemical etching of the specimen may be required to remove residual un-melted powder to improve surface finish if needed.

Figure 6:
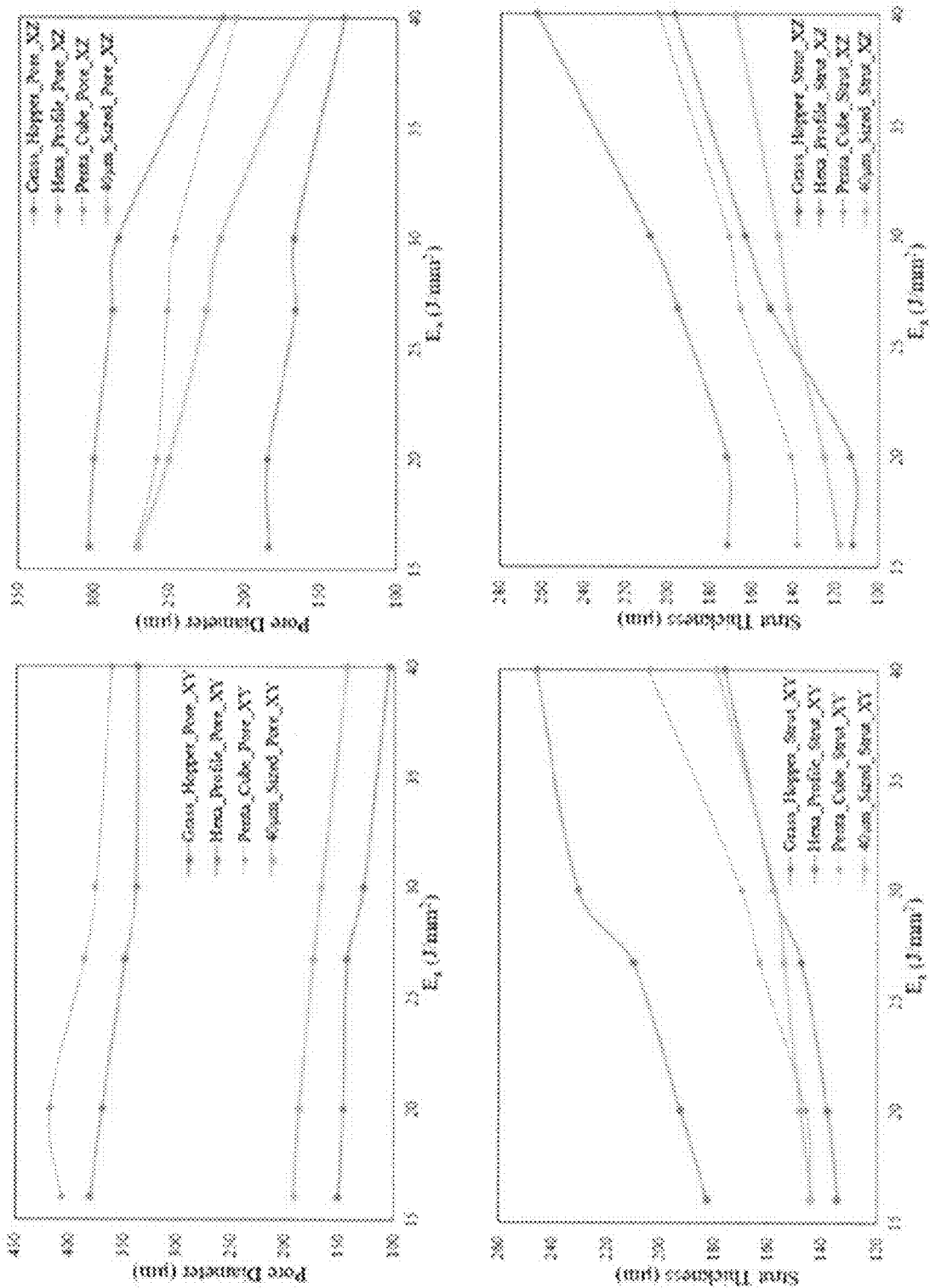
FIG. 6 illustrates experimental data for a number of example lattice geometries, according to an example embodiment.

In a further aspect, optical micrographs of as-built W lattice specimens were obtained in the XY and XZ planes as a function of the L-PBF parameter energy density. Image processing was used to obtain several measurements of each lattice structure's geometric features. These measurements were then used to derive the average strut thickness, average pore diameter (inter-strut cell size), and average unit cell size for each specimen, as well as the associated standard deviations as function of energy density, as shown in FIG. 6.

In a further aspect, in the example experiment, it was observed that a higher energy density generates a larger melt pool, which then results in larger strut thickness. Accordingly, it can be observed that strut thickness is indeed proportional energy density. Conversely, the pore size is inversely proportional to the energy density. In this regard, the unit cell size varied somewhat as a function of the energy density and may be attributed to either measurement error or residual stress induced distortion.

In a further aspect, in the case of the observed lattice topologies, the pore and strut sizes remained varied predictably with topology type, even with when considering change of energy density. During the example experiment, the pore size target range was 87-393 um and the smallest pore range in XY was the Grasshopper lattice geometry (from 106.7-157.6±6.7 µm) (FIG. 5A and FIG. 5B) and the largest being Penta Cube (from 362.2-407.5±8.8 µm) (FIG. 3). Further, during the example experiment, the smallest pore range in XZ was the Grasshopper lattice geometry (from 134.4-185.5±17.8 µm) and the largest being Penta Cube (from 362.2-407.5±8.8 µm). In this regard, the majority of the pore sizes were within the target range and can be tailored for pressure drop requirements using specific build parameters.

In a further aspect, during the example experiment, the strut thickness target range was 74-86 µm, with the smallest strut range in XY being the Grasshopper lattice geometry (from 134.6-176.7±µm) and the largest being Hexa Profile (from 183.0-246.4±7.5 µm). Additionally, the smallest strut in XZ was 40 µm Sized Surface (also referred to herein as "Lattice-04 60 micrometers lattice geometry") (from 118.4-168.6±11.9 µm) (FIGS. 4A and 4B) and the largest being Hexa Profile (from 172.0-262.8±10.8 µm) (FIG. 2A and FIG. 2B). Thus, strut thickness exceeded desired target range varying between 2× to 4× of nominal, and it can be expected that although thicker struts with a corresponding small pore size may be deleterious to flow properties, it also may imply that these topologies exhibit stronger mechanical properties.

Figure 7:
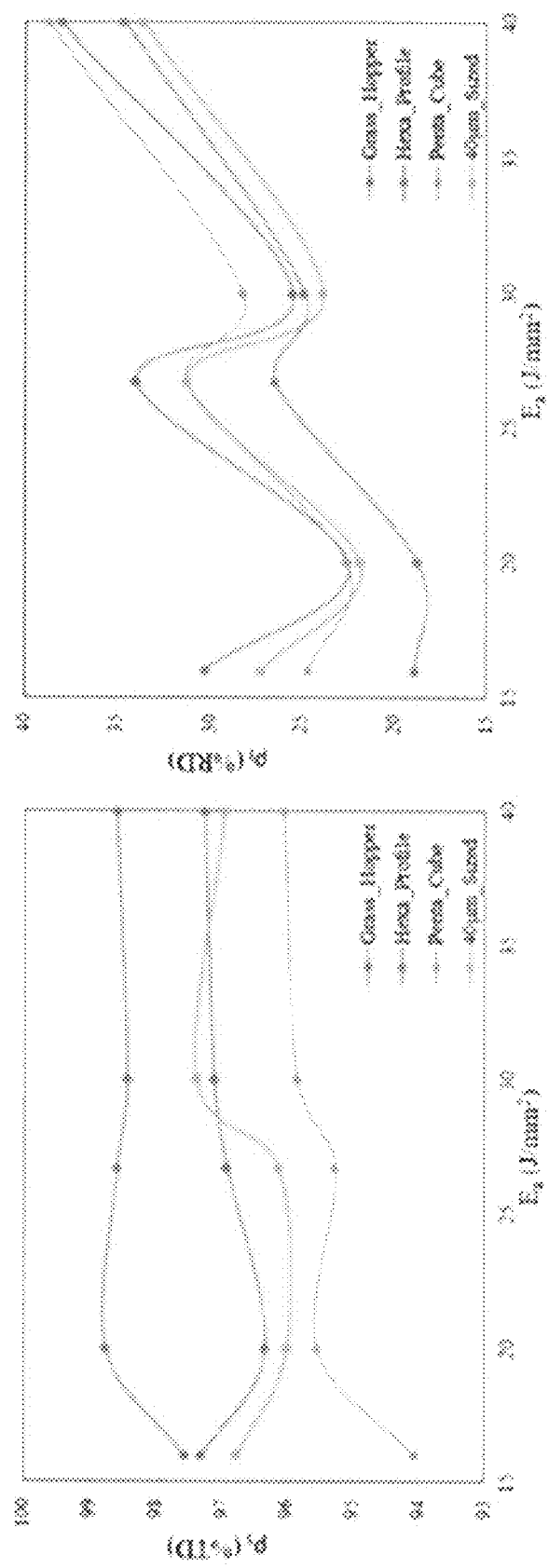
FIG. 7 illustrates experimental data for a number of example lattice geometries, according to an example embodiment.

In a further aspect, strut solid density ($\rho s$) in percent theoretical density (% TD) vs. $E_a$, as well as lattice density ($\rho l$) in percent relative density (% RD) vs. $E_a$, are show in FIG. 7.

Additionally, $\rho s$ and $\rho l$ were determined using W lattice specimen masses, envelope dimensions, and solid volumes measured using a helium pycnometer. Strut $\rho s$ ranges from 95-98.8% TD were demonstrated with little variation with $E_a$, influenced primarily by micro-cracking. Further, $\rho l$ range was 18-39% RD correlating with $E_a$.

Finally, although optical and SEM micrographs provided a degree of geometric and physical characterization, the results are localized and often unable to provide insight on the spatial distribution of these geometric features. Thus, nondestructive methods were undertaken to provide more global specimen characterization.

Specifically, a commercial service was contracted to inspect a series of ultra-fine lattice specimens using x-ray microcomputer tomography (µ-CT). The high spatial resolution provided by µ-CT was able to discern fine geometric features such as changes in strut thickness and cell volume (inter-strut pore size) throughout the entire specimen.

Additionally, un-melted excess material (e.g., metal powder powder) trapped within cell volumes that was not removed during post-print cleaning was found and appear as a lower density regions in the scan images. Ti6Al4V and W CT lattice specimens were provided and included Hexa Cube, Penta Cube, 40 µm Sized-Surface, and 40 µm Sized-Surface.

In a further aspect, it was observed that Ti6Al4V has a relatively low effective atomic number with low radio-opacity, further indicating that a sufficient x-ray flux can penetrate into the part and to the detector to yield a sufficiently high signal-to-nose ratio that allow for images to be resolved with adequate resolution.

Additionally, the Ti6Al4V scans show spatial variations in strut thickness, cell volume, and trapped excess material within cell volumes. The Ti6Al4V specimen scan images also yielded excellent specimen geometric feature resolution, which was then compared to the specimen design files (e.g. CAD file) in order to determine variation between as-designed and as-printed conditions. As observed with optical microscopy the strut diameters were on the upper limit of the design specification, which also results in reduced pore diameter and cell volume.

As expected µ-CT was unable to resolve useful images for inspection of the W specimens, due, at least in part, to having a high atomic number and associated high radio-opacity resulting in high scatter, low penetration depth, and poor signal-to-noise ratio. It should also be noted that although μ-CT is very powerful tool, it is not necessarily practical for routine inspection of intricate or large parts in high production rate scenario due to the long scan times, large data files, and cost. In other words, the μ-CT may be best utilized to characterize geometric changes in the initial production process order to compensate designs for subsequent production without utilizing these inspection methods.

Phase 5: Mechanical Testing of Ultra-Fine Lattice Specimens

In the fifth phase of the example experiment, mechanical testing was conducted to determine one or more mechanical properties of ultra-fine lattice structures.

In particular, in the example experiment, the compressive quasi-static behavior of ultra-fine lattice cube specimens (10×10×10 mm) was characterized using a psylotech mesoscale load frame equipped with a 10 kN load cell. The lattice specimens were tested with loading axis parallel to the build axis. Further a self-aligning loading block ensured that the load was distributed as uniformly as possible during the entire test. Additionally, deformation was recorded by the crosshead displacement.

The engineering stress and strain of the loaded lattice specimens were obtained by dividing the reaction force by the original cross-sectional area and the displacement by the un-deformed height of the specimens respectively. Consequently, the flow stress curves illustrated in FIG. 7 are also a representation of the lattice structures. It should also be noted that the flow stress data illustrated in these figures has been truncated to the first recorded localized fracture on struts or nodes, which was chosen as a criteria for material failure.

Figure 8:
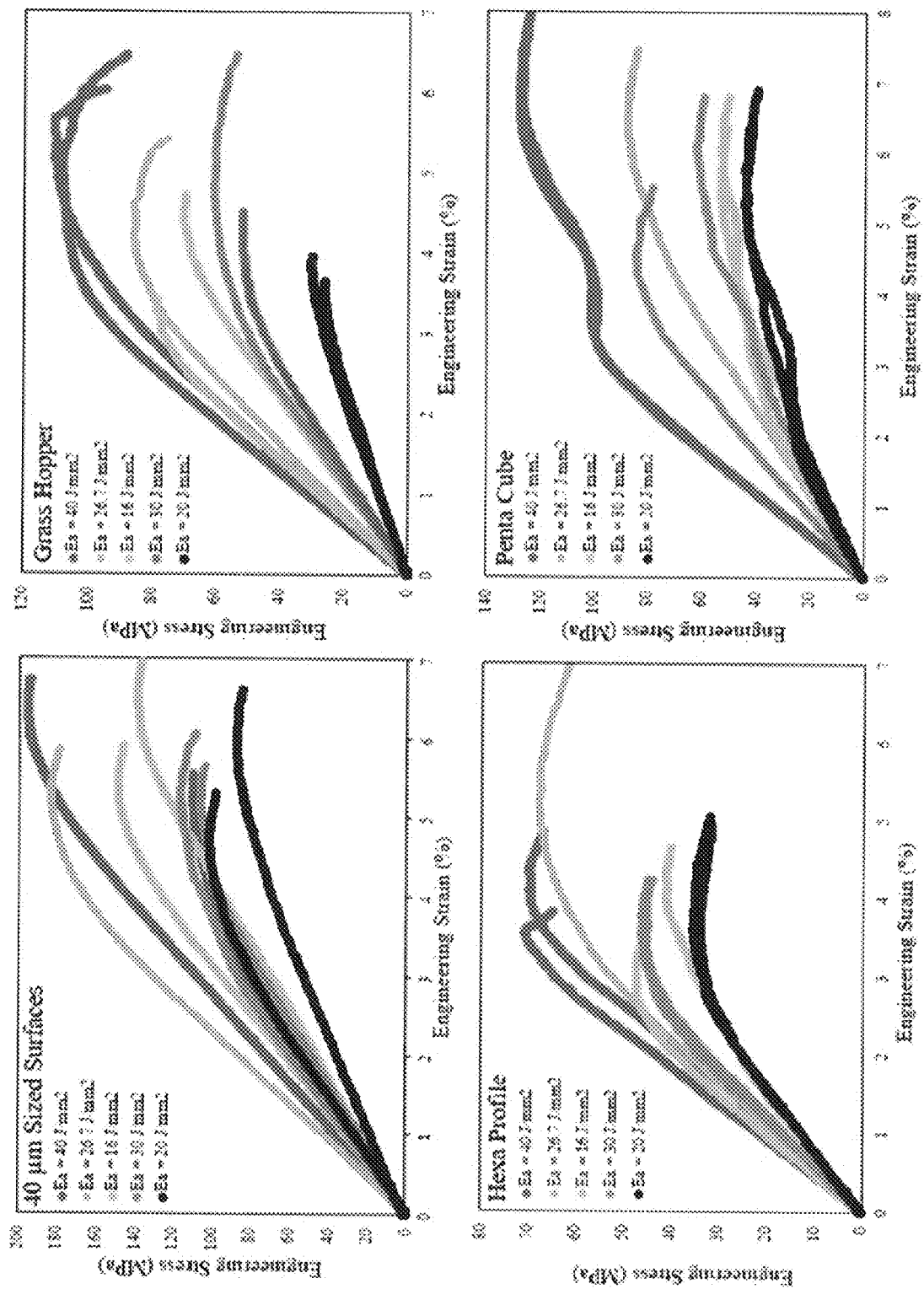
FIG. 8 illustrates experimental data for a number of example lattice geometries, according to an example embodiment.

During the example experiment, strength and ductility showed a dependence not only on the specific lattice topology but also on the build parameters used to generate the specimens. In a further aspect, structural geometry may have a major role in the mechanical response since different struts may experience different deformation modes including tension, compression, bending or a combination of these modes. Similarly, the influence of AM build parameters on the mechanical performance of components has been well documented, and FIG. 8 illustrates the grouped compressive behavior of each lattice topology type as a function of build energy density.

During the example experiment, throughout the specimens, an elastic-plastic behavior was observed. In terms of peak load, 40 μm Sized Surfaces, with an overall higher engineering stress range (85-195 MPa) prevailed over other lattice topologies, namely, the Grasshopper (25-100 MPa), Hexa Profile (35-70 MPa), and Penta Cube (45-125 MPa) lattice geometries. In this regard, peak load ranges appear to have a direct correlation to the relative densities of the structures. Therefore, one of the advantages of lattice structures is that geometry features such as node spacing, strut thickness, orientation can be manipulated in order to control deformation behavior while experiencing external loads.

Figure 9:
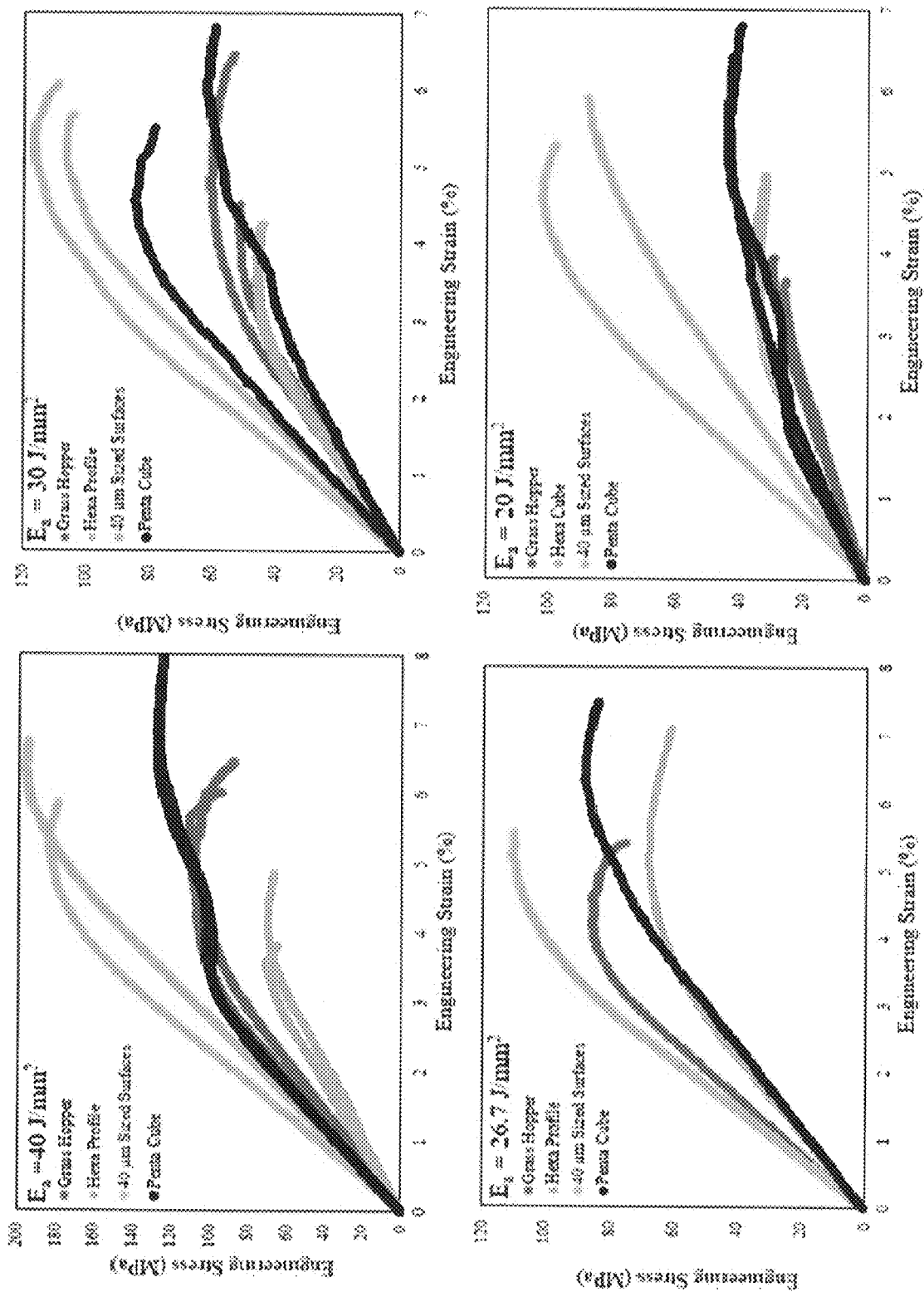
FIG. 9 illustrates experimental data for a number of example lattice geometries, according to an example embodiment.

In a further aspect, the hardening-based stress behavior of some of the Penta Cube curves (20, 30 and 40 J/mm$^2$) showed plateau and densification regions before structural fracture. This phenomena could be caused by a multiplicity of factors, hence further analyses are required. FIG. 9 illustrates the compressive flow stress curve behavior of the different ultra-fine lattice topologies as a function of varying the build energy density.

In a further aspect, it was observed that the 40 μm Sized Surfaces lattice topology consistently outperformed the other lattice topologies. In addition, there appears to be a direct correlation observed between the build energy density and the lattice peak load. This phenomena confirms what had been discussed previously in the microstructural characterization section above, where a higher build energy density generates a larger melt pool, which when solidifies produces thicker struts that allow for a higher peak load to be withstood. Additionally, although a higher peak load for a given lattice topology at a specific energy density could be desirable as was observed from optical micrographs the corresponding pore size decreases inversely with energy density, directly impacting gas or liquid flow behavior.

In a further aspect, during the example experiment, several of the compression tests were videoed to undergo digital image correlation that was used to extract ultra-fine lattice specimen deformation as a function of compression state. This evaluation method enabled the identification and refined understanding of how regional deformation moves throughout the lattice, from struts to nodes, as the load is increased during the compression test to failure. These results may also be used in subsequent structural analysis. In other words, mechanical property data may be used to construct and inform baseline simulation and modeling tools to improve the lattice design process in order to optimize subsequent ultra-fine lattice topologies for expected load conditions.

To further inform what particular lattice topology and build parameter set should be selected for use in one or more specific propulsion catalyst applications, an additional selection criteria beyond geometric dimensions and mechanical behavior may be required.

Phase 6: Flow Characterization of Ultra-Fine Lattice Specimens

In the sixth phase of the example experiment, flow characterization testing was conducted to determine one or more flow characterization properties of ultra-fine lattice structures.

In particular, in the example experiment, the characterization of gas and liquid flow through the different ultra-fine lattice topology types was undertaken. Specifically, pressure drops across a specimen measurements were conducted in order to determine flow through the lattice specimens. In one aspect, the Flow Coefficient (or $K_v$, (m$^3$/hour), the relative efficiency of a restriction to allow fluid flow through it) was defined as the amount of water that flows through a restriction at 16° C. with a pressure loss of 1 bar. $K_v$ for water was then calculated by the equation:

$$K_v = Q\sqrt{\frac{\gamma}{\Delta P}} = \frac{Q}{\sqrt{\Delta P}}$$

(where Q is the volumetric flow rate (m$^3$/hour), γ is the specific gravity of water (1 g/cm3) and ΔP is the pressure drop across the restriction (bar)). $K_v$ was also determined for subsonic $$\left(\Delta P < \frac{P_1}{2}\right)$$

gaseous nitrogen, using the following equation:

$$K_v = \frac{Q}{30.8 * \sqrt{\frac{\Delta P * P_2}{\gamma * T}}}$$

(where γ is the specific gravity (kg/m3) of the gas at standard conditions at 20° C. and T(K) is the gas absolute temperature).

One test apparatus was constructed for water and another test apparatus was constructed for gaseous nitrogen. Both test apparatuses were calibrated, and utilized to obtain the desired data. Flow tests were then conducted perpendicular to the build direction (XY) of the ultra-fine lattice specimen, as well as parallel to the build direction (XZ) ultra-fine lattice specimen, for both gaseous nitrogen and water.

Figure 10A:
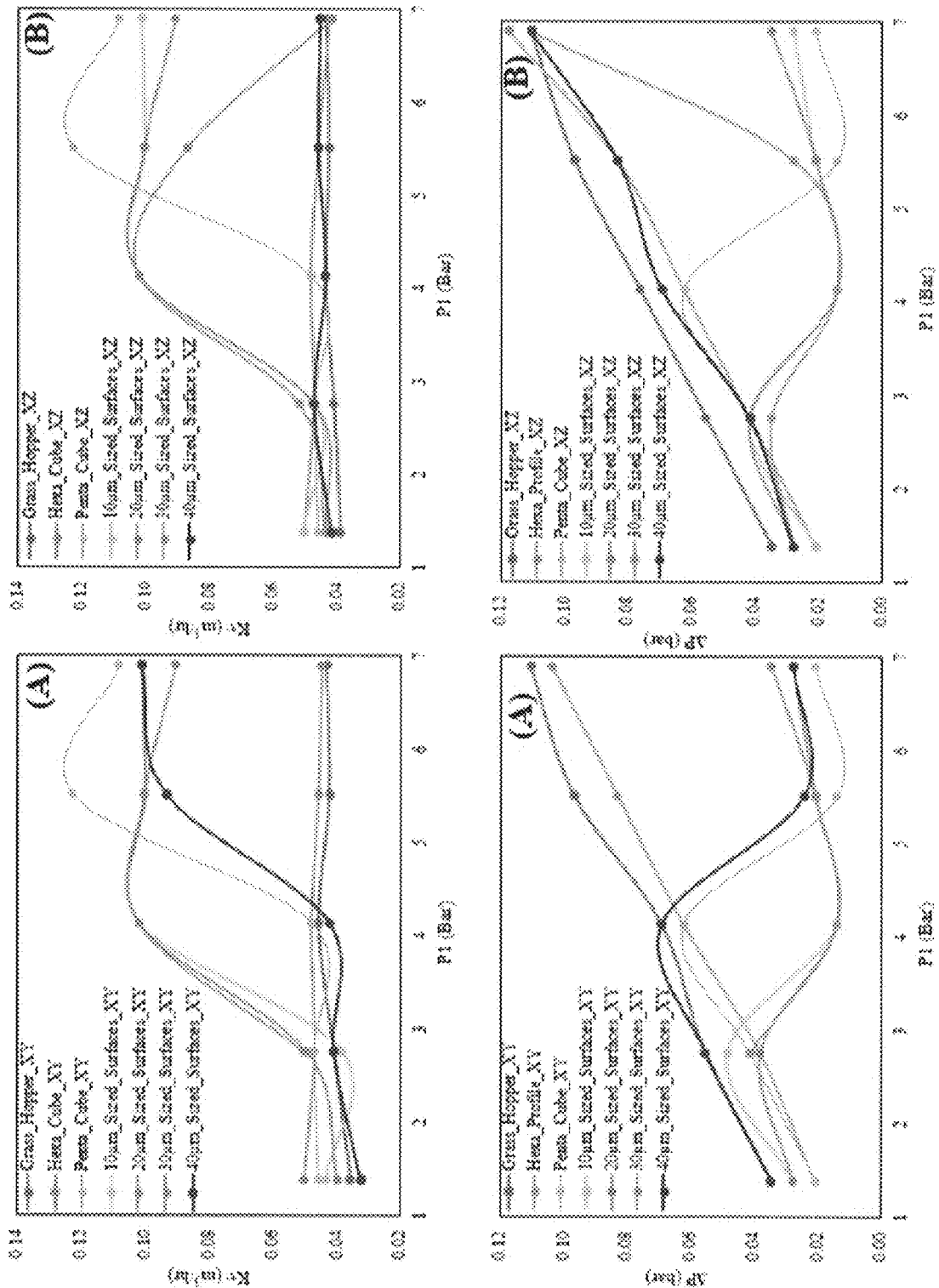
FIG. 10*a* illustrates experimental data for a number of example lattice geometries, according to an example embodiment.
Figure 10B:
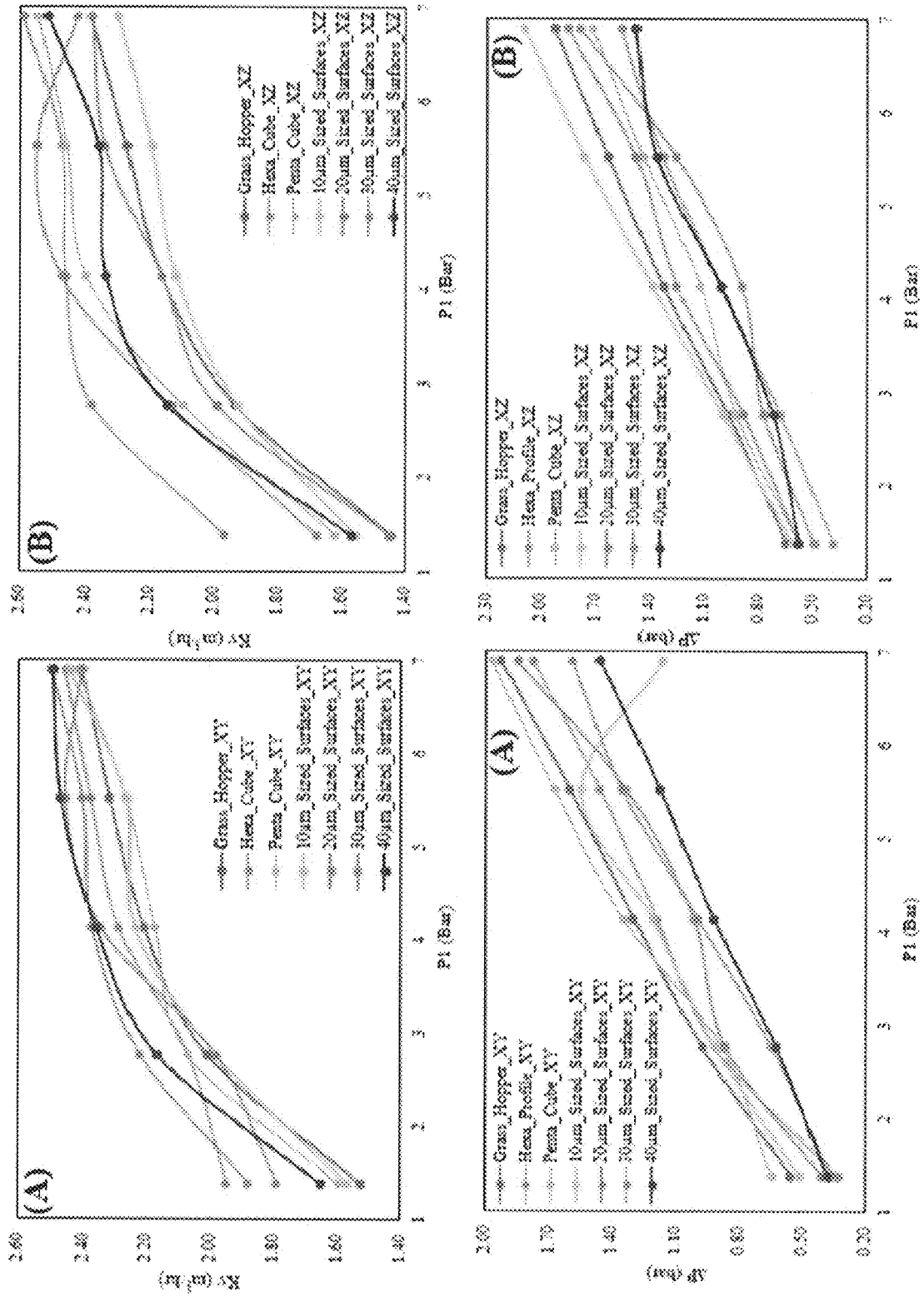
FIG. 10*b* illustrates experimental data for a number of example lattice geometries, according to an example embodiment.

As shown in FIGS. 10a (water) and 10b (nitrogen), the results for gaseous nitrogen data show relatively consistent trends in $K_v$ and ΔP as a function of both pressure and lattice topology. In the example experiment, the water flow data has a larger degree of variability compared to the nitrogen results. It was also observed that no significant differences can be inferred between XY and XZ directions, with the dominant influence being lattice topology type. Although studies have shown that the lattice unit cell has the largest influence on $K_v$ and ΔP since a larger unit cell results in a larger pore diameter and more flow area, for this specific application the small unit size is required to meet the operational intent and optimization of the unit cell size would likely yield little improvement in performance.

CONCLUSION

Based on the results in the example experiment, AM ultra-fine lattices met all requirements to as mono-propellant catalysts. Production costs in terms of feedstock, time, and post-processing is relatively low with improved schedule control. Additionally, mechanical and flow properties were found to be as good or better over traditional coated foam products.

B. Example Method

Figure 11:
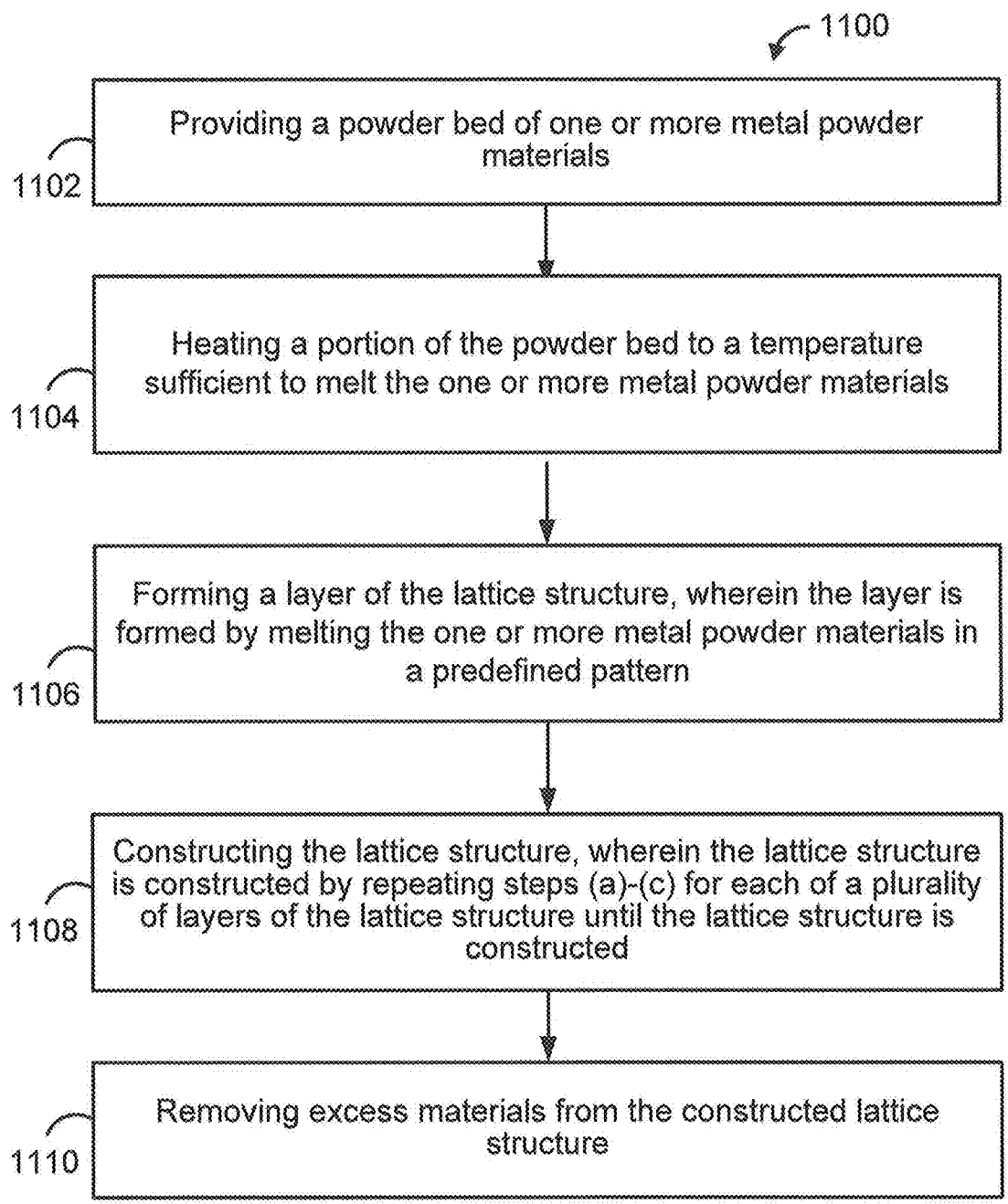
FIG. 11 is a flow chart of an example method.

FIG. 11 is a flow chart illustrating an example method 1100.

At block 1102, the method 1100 can include, providing a powder bed of one or more metal powder materials (e.g., one or more catalyst materials). In some examples, the one or more metal powder materials comprise one or more of the following: (i) tungsten, (ii) aluminum, (iii) titanium; (iv) platinum; (v) rhodium; (vi) iridium; (vii) ruthenium; (viii) silver; and/or combinations thereof.

At block 1104, the method 1100 can include, heating a portion of the powder bed to a temperature sufficient to melt the one or more metal powder materials. In some examples, the portion of the powder bed is heated with a laser. In other examples, the laser is of sufficient power to melt the one or more metal powder materials.

At block 1106, the method 1100 can include forming a layer of the lattice structure, wherein the layer is formed by melting the one or more metal powder materials in a predefined pattern. In some examples, the predefined pattern comprises a hexa profile lattice geometry. In other examples, the predefined pattern comprises a penta cube lattice geometry. In still other examples, the predefined pattern comprises a Lattice-04 40 micrometers lattice geometry. In some examples, the predefined pattern comprises a Lattice-04 60 micrometers geometry. In other examples, the predefined pattern comprises a Lattice-04 80 micrometers lattice geometry. In still other examples, the predefined pattern comprises a Lattice-04 70 micrometers lattice geometry. In still other examples, the predefined pattern comprises a grasshopper lattice geometry.

At block 1108, the method 1100 can also include constructing the lattice structure, wherein the lattice structure is constructed by repeating one or more steps of the methods described herein for each of a plurality of layers of the lattice structure until the lattice structure is constructed. In some examples, the lattice structure comprises an ultra-fine lattice structure. In other examples, the lattice structure comprises a median strut thickness of approximately 100 micrometers.

At block 1110, the method 1100 can also include removing excess materials from the constructed lattice structure. In some examples, the excess materials include one or more metal powder materials that were not melted during steps (a)-(d). In other examples, removing excess materials from the constructed lattice structure comprises applying mechanical agitation to the constructed lattice structure. In still other examples, removing excess materials from the constructed lattice structure comprises applying vacuum to the constructed lattice structure. In other examples, removing excess materials from the constructed lattice structure comprises applying mechanical agitation to the constructed lattice structure. In still other examples, removing excess materials from the constructed lattice structure comprises applying mechanical agitation, compressed gas, and vacuum, to the constructed lattice structure. In still other examples, removing excess materials from the constructed lattice structure comprises applying compressed gas through the constructed lattice structure in multiple directions and sonicating the constructed lattice structure in one or more of: (i) deionized water; and (ii) isopropyl alcohol.

B. Example Computing Device

Figure 12:
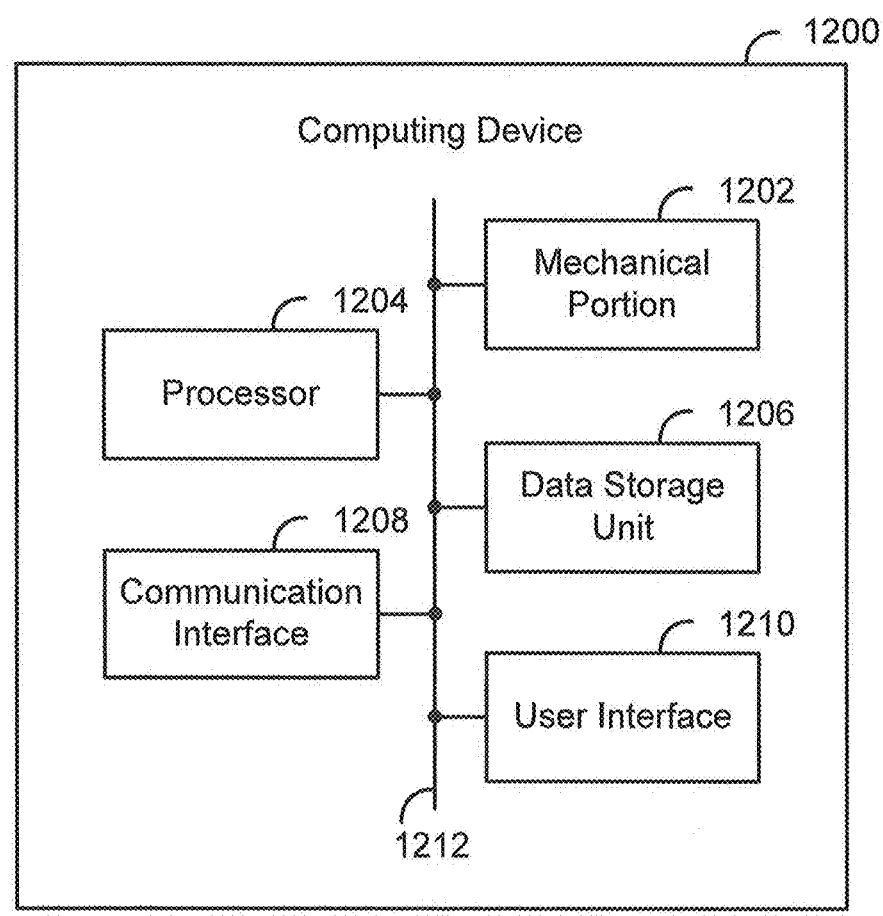
FIG. 12 is an example computing device according to the present disclosure.

FIG. 12 is a simplified block diagram of an example computing device 1200. The computing device 1200 can be configured to perform and/or can perform one or more acts and/or functions, such as those described in this disclosure (e.g., the claimed set of operations).

The computing device 1200 can include various components, such as a mechanical portion 1202, a processor 1204, a data storage unit 1206, a communication interface 1208, and/or a user interface 1210. Each of these components can be connected to each other via a connection mechanism 1212.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The mechanical portion 1202 can include electrical and/or mechanical portions and/or devices now known or later developed, including but not limited to heating sources (e.g., one or more lasers), as well as air, gas, vacuum, deionized water, and/or alcohol sources and/or devices, sonicating devices, and/or a combination thereof, among other possibilities. In a further aspect, any of these electrical and/or mechanical portions and/or devices may be potentially used in connection with one or more automated mechanical devices (e.g., automated tracks, robotic arms, etc.).

The processor 1204 can include a general-purpose processor (e.g., a microprocessor) and/or a special-purpose processor (e.g., a digital signal processor (DSP)). The processor 1204 can execute program instructions included in the data storage unit 1206 as discussed below.

The data storage unit 1206 can include one or more volatile, non-volatile, removable, and/or non-removable storage components, such as magnetic, optical, and/or flash storage, and/or can be integrated in whole or in part with the processor 1204. Further, the data storage unit 1206 can take the form of a non-transitory computer-readable storage medium, having stored thereon program instructions (e.g., compiled or non-compiled program logic and/or machine code) that, upon execution by the processor 1204, cause the computing device 1200 to perform one or more acts and/or functions, such as those described in this disclosure.

These program instructions can define, and/or be part of, a discrete software application. In some instances, the computing device 1200 can execute program instructions in response to receiving an input, such as an input received via the communication interface 1208 and/or the user interface 1210. The data storage unit 1206 can also store other types of data, such as those types described in this disclosure.

The communication interface 1208 can allow the computing device 1200 to connect with and/or communicate with another entity, such as another computing device, according to one or more protocols. In one example, the communication interface 1208 can be a wired interface, such as an Ethernet interface. In another example, the communication interface 1208 can be a wireless interface, such as a cellular or WI FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 1210 can include hardware and/or software components that facilitate interaction between the computing device 1200 and a user of the computing device 1200, if applicable. As such, the user interface 1210 can include input components such as a keyboard, a keypad, a mouse, a touch sensitive panel, and/or a microphone, and/or output components such as a display device (which, for example, can be combined with a touch sensitive panel), a sound speaker, and/or a haptic feedback system.

The computing device 1200 can take various forms, such as a workstation terminal, a desktop computer, a laptop, a tablet, and/or a mobile phone. In a further aspect, the features described herein may involve some or all of these components arranged in different ways, including additional or fewer components and/or different types of components, among other possibilities.

In a further aspect, computing device 1200 may be used to execute and perform one or more of the process or method steps described herein, including: (a) providing a powder bed of one or more metal powder materials; (b) heating a portion of the powder bed to a temperature sufficient to melt the one or more metal powder materials (e.g., using one or more lasers and/or additional heating sources); (c) forming a layer of the lattice structure, wherein the layer is formed by melting the one or more metal powder materials in a predefined pattern (e.g., using one or more lasers and/or additional heating sources); (d) constructing the lattice structure, wherein the lattice structure is constructed by repeating steps (a)-(c) for each of a plurality of layers of the lattice structure until the lattice structure is constructed; and (e) removing excess materials from the constructed lattice structure (e.g., using one or more sonication and/or air sources).

II. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A method for manufacturing a lattice structure for use as a propulsion catalyst, the method comprising:
   (a) providing a powder bed of one or more metal powder materials;
   (b) heating a portion of the powder bed to a temperature sufficient to melt the one or more metal powder materials;
   (c) forming a layer of the lattice structure, wherein the layer is formed by melting the one or more metal powder materials in a predefined pattern;
   (d) constructing the lattice structure, wherein the lattice structure is constructed by repeating steps (a)-(c) for each of a plurality of layers of the lattice structure until the lattice structure is constructed; and
   (e) removing excess materials from the constructed lattice structure.

2. The method of claim 1, wherein the lattice structure comprises an ultra-fine lattice structure with a median strut thickness of approximately 100 micrometers.

3. The method of claim 1, wherein the one or more metal powder materials comprises platinum.

4. The method of claim 1, wherein the one or more metal powder materials comprises rhodium.

5. The method of claim 1, wherein the one or more metal powder materials comprises iridium.

6. The method of claim 1, wherein the portion of the powder bed is heated with a laser.

7. The method of claim 1, wherein the one or more metal powder materials comprises one or more catalyst materials.

8. The method of claim 1, wherein the predefined pattern comprises a hexa profile lattice geometry.

9. The method of claim 1, wherein the predefined pattern comprises a penta cube lattice geometry.

10. The method of claim 1, wherein the predefined pattern comprises a Lattice-04 40 micrometers lattice geometry.

11. The method of claim 1, wherein the predefined pattern comprises a Lattice-04 60 micrometers lattice geometry.

12. The method of claim 1, wherein the predefined pattern comprises a Lattice-04 80 micrometers lattice geometry.

13. The method of claim 1, wherein the predefined pattern comprises a Lattice-04 70 micrometers surface lattice geometry.

14. The method of claim 1, wherein the predefined pattern comprises a grasshopper lattice geometry.

15. The method of claim 1, wherein the excess materials include one or more metal powder materials that were not melted during steps (a)-(d).

16. The method of claim 1, wherein removing excess materials from the constructed lattice structure comprises applying mechanical agitation to the constructed lattice structure.

17. The method of claim 1, wherein removing excess materials from the constructed lattice structure comprises applying compressed gas to the constructed lattice structure.

18. The method of claim 1, wherein removing excess materials from the constructed lattice structure comprises applying vacuum to the constructed lattice structure.

19. The method of claim 1, wherein removing excess materials from the constructed lattice structure comprises applying mechanical agitation, compressed gas, and vacuum, to the constructed lattice structure.

20. The method of claim 1, wherein removing excess materials from the constructed lattice structure comprises applying compressed gas through the constructed lattice structure in multiple directions and sonicating the constructed lattice structure in one or more of: (i) deionized water; and (ii) isopropyl alcohol.

21. A non-transitory computer-readable medium, having stored thereon program instructions that, upon execution by a computing device, cause the computing device to perform a set of operations for manufacturing a lattice structure for use as a propulsion catalyst, the set of operations comprising:
(a) providing a powder bed of one or more metal powder materials;
(b) heating a portion of the powder bed to a temperature sufficient to melt the one or more metal powder materials;
(c) forming a layer of the lattice structure, wherein the layer is formed by melting the one or more metal powder materials in a predefined pattern;
(d) constructing the lattice structure, wherein the lattice structure is constructed by repeating steps (a)-(c) for each of a plurality of layers of the lattice structure until the lattice structure is constructed; and
(e) removing excess materials from the constructed lattice structure.

* * * * *